(12) United States Patent
Tanaka et al.

(10) Patent No.: US 10,606,108 B2
(45) Date of Patent: Mar. 31, 2020

(54) DISPLAY DEVICE

(71) Applicant: Japan Display Inc., Tokyo (JP)

(72) Inventors: Hiromichi Tanaka, Tokyo (JP); Takeshi Kaneki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/616,246

(22) Filed: Jun. 7, 2017

(65) Prior Publication Data
US 2018/0011367 A1    Jan. 11, 2018

(30) Foreign Application Priority Data
Jul. 6, 2016   (JP) .................. 2016-134206

(51) Int. Cl.
| | |
|---|---|
| G02F 1/1333 | (2006.01) |
| F21V 8/00 | (2006.01) |
| B32B 27/36 | (2006.01) |
| B32B 5/18 | (2006.01) |
| B32B 17/06 | (2006.01) |
| B32B 5/22 | (2006.01) |
| B32B 3/08 | (2006.01) |
| B32B 27/06 | (2006.01) |
| B32B 7/12 | (2006.01) |
| G02F 1/1335 | (2006.01) |
| G06F 1/16 | (2006.01) |

(52) U.S. Cl.
CPC .......... *G02F 1/133308* (2013.01); *B32B 3/08* (2013.01); *B32B 5/18* (2013.01); *B32B 5/22* (2013.01); *B32B 7/12* (2013.01); *B32B 17/06* (2013.01); *B32B 27/06* (2013.01); *B32B 27/36* (2013.01); *G02B 6/005* (2013.01); *G02B 6/0068* (2013.01); *G02B 6/0088* (2013.01); *G02F 1/1333* (2013.01); *G02F 1/133528* (2013.01); *G06F 1/1601* (2013.01); *B32B 2266/025* (2013.01); *B32B 2307/402* (2013.01); *B32B 2307/414* (2013.01); *B32B 2307/416* (2013.01); *B32B 2307/558* (2013.01); *B32B 2307/71* (2013.01); *B32B 2405/00* (2013.01); *B32B 2457/20* (2013.01); *G02F 2001/133322* (2013.01); *G02F 2202/28* (2013.01)

(58) Field of Classification Search
CPC .................. G02F 1/133308; G02B 6/0088
See application file for complete search history.

(56) References Cited

U.S. PATENT DOCUMENTS

| | | | | |
|---|---|---|---|---|
| 2010/0328571 A1* | 12/2010 | Itaya | .............. | G02F 1/133308 349/58 |
| 2014/0176863 A1* | 6/2014 | Oohira | .............. | G02B 6/0088 349/62 |
| 2015/0237182 A1* | 8/2015 | Lee | .............. | H04N 5/645 455/566 |
| 2015/0241731 A1 | 8/2015 | Jeong et al. | | |

FOREIGN PATENT DOCUMENTS

JP       2014-126685 A     7/2014

* cited by examiner

*Primary Examiner* — Kent W Chang
*Assistant Examiner* — Chayce R Bibbee
(74) *Attorney, Agent, or Firm* — Michael Best & Friedrich LLP

(57) ABSTRACT

A display device includes a panel, a backlight, and an adhesive tape. The backlight is placed under the panel. The adhesive tape has a light blocking property and is bonded to an end face of the panel and the backlight.

2 Claims, 11 Drawing Sheets

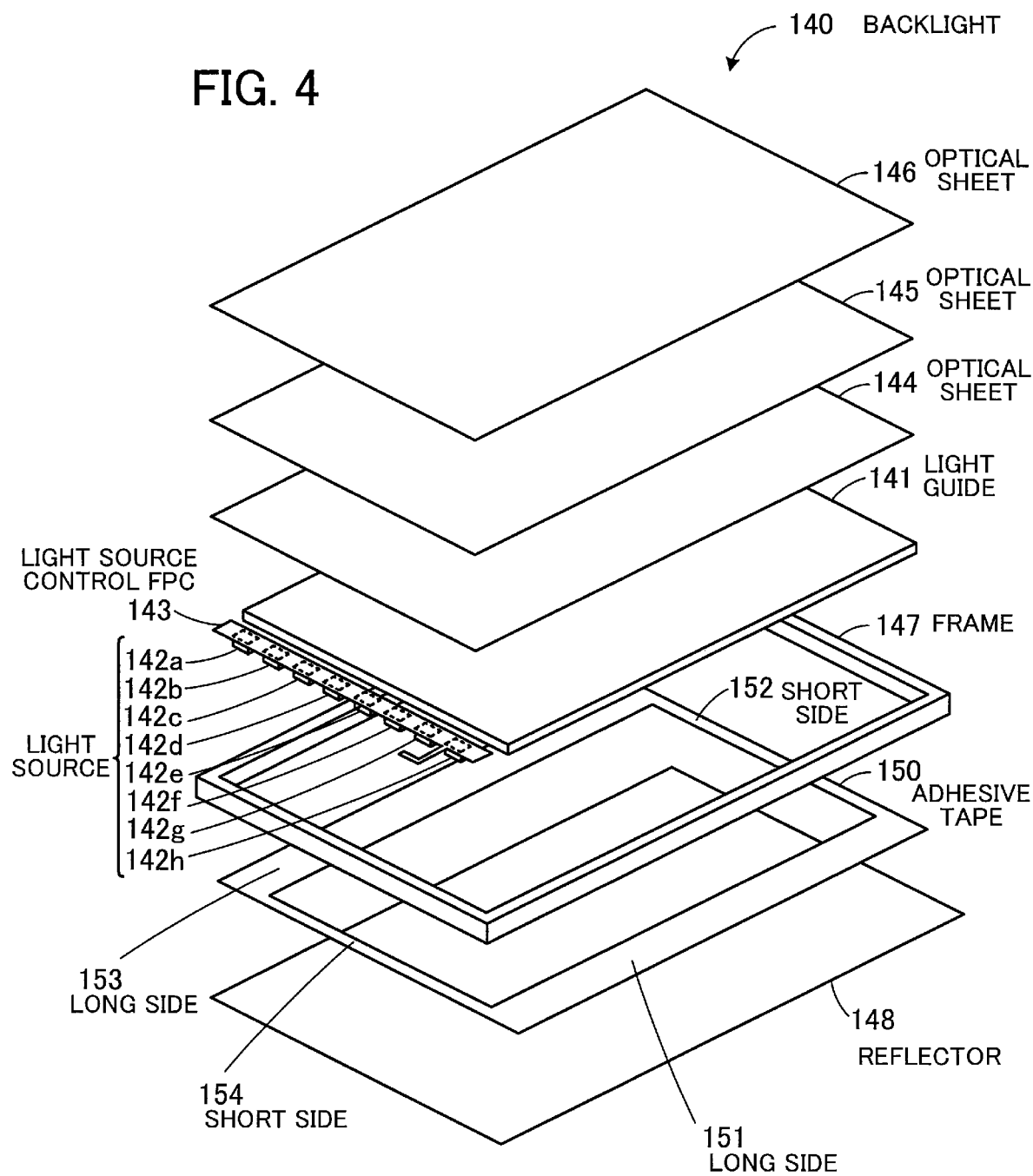

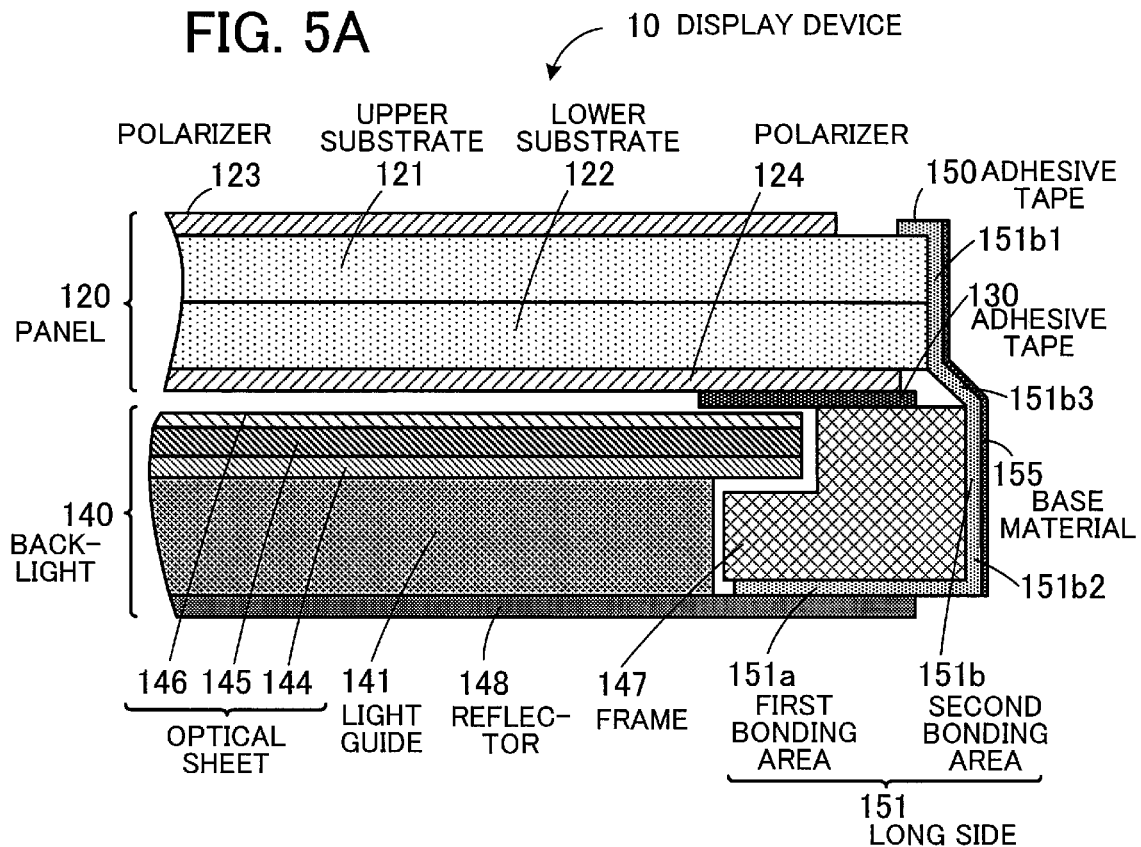
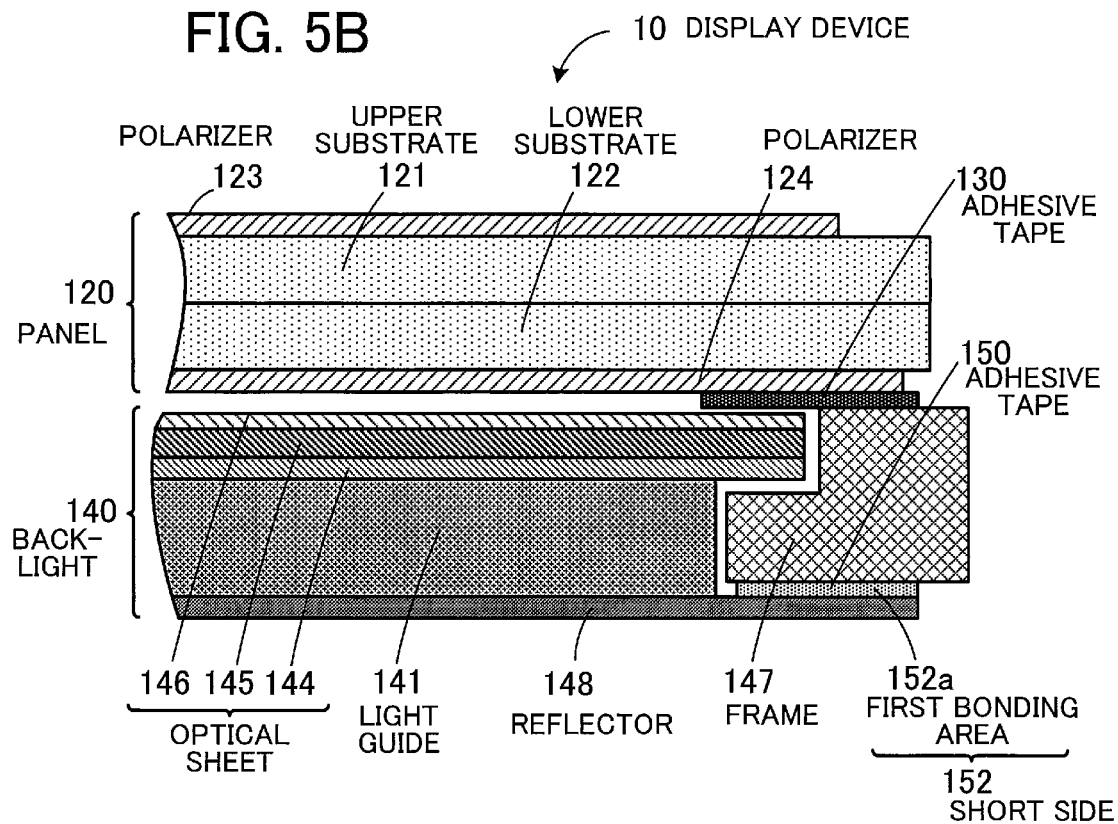

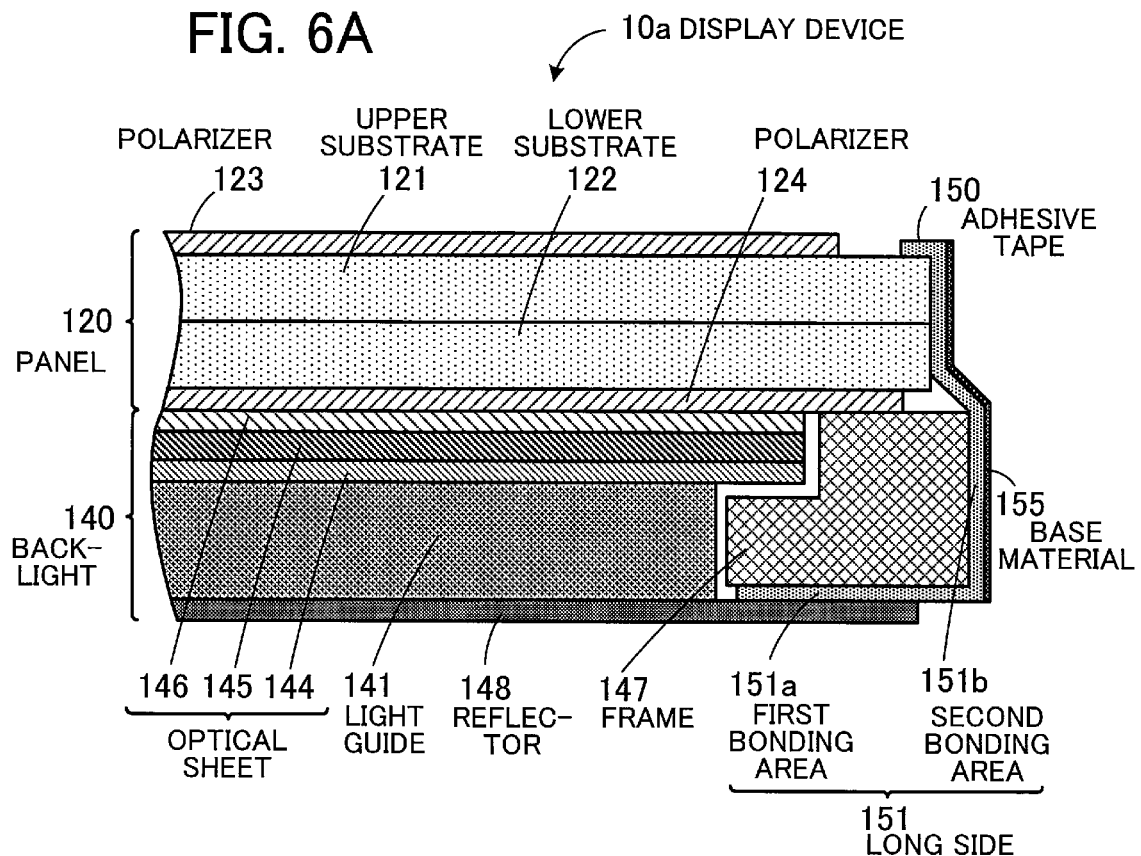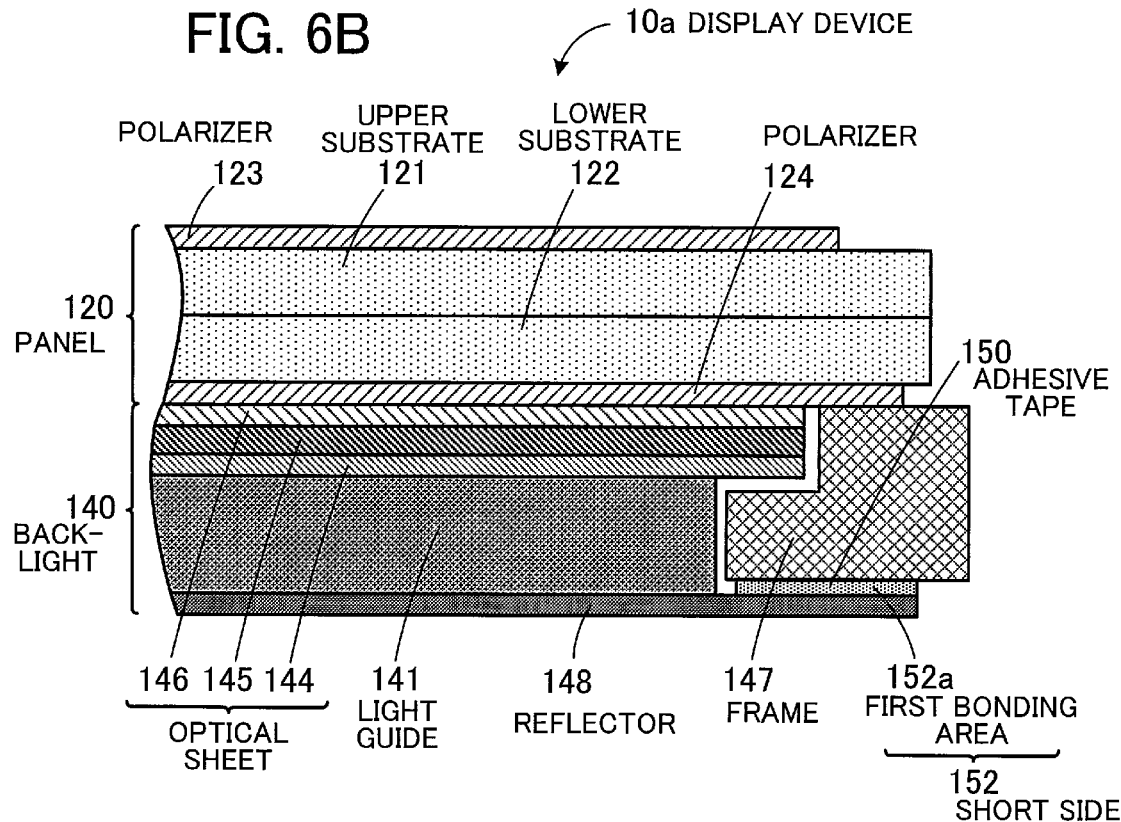

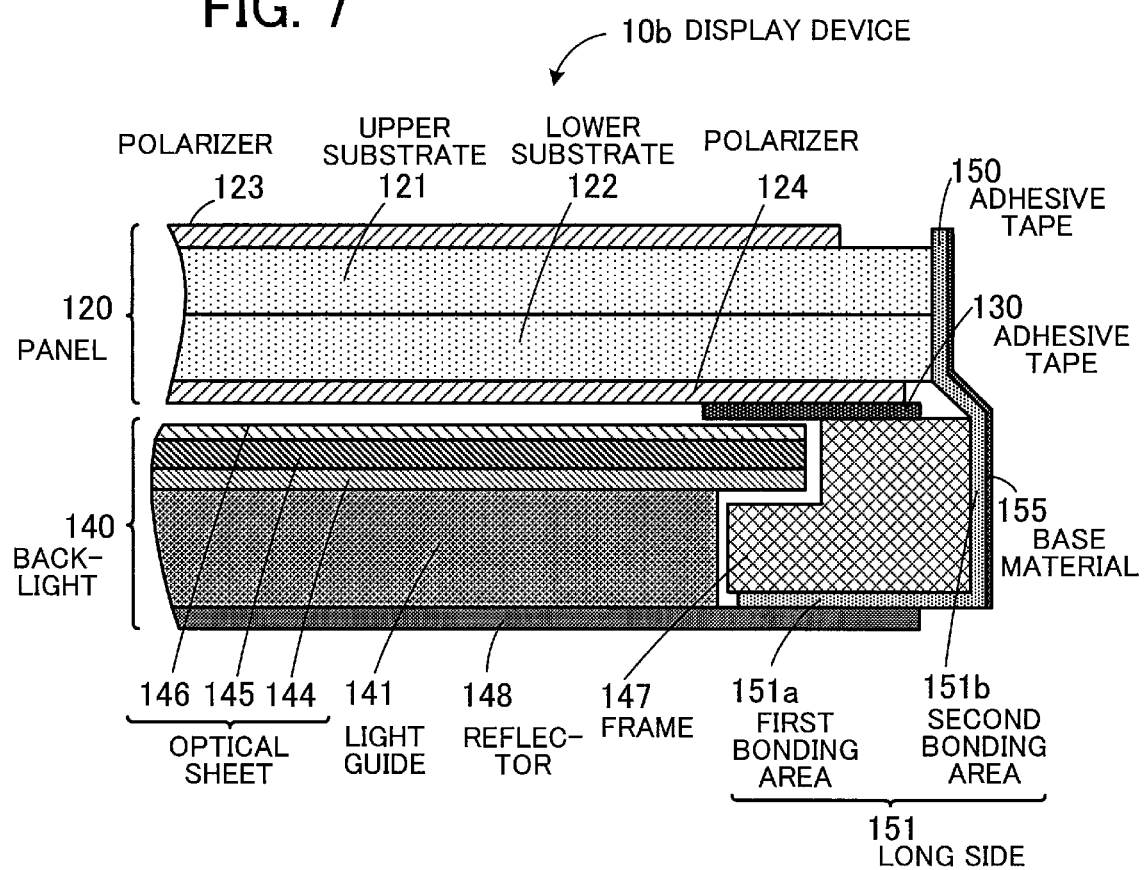

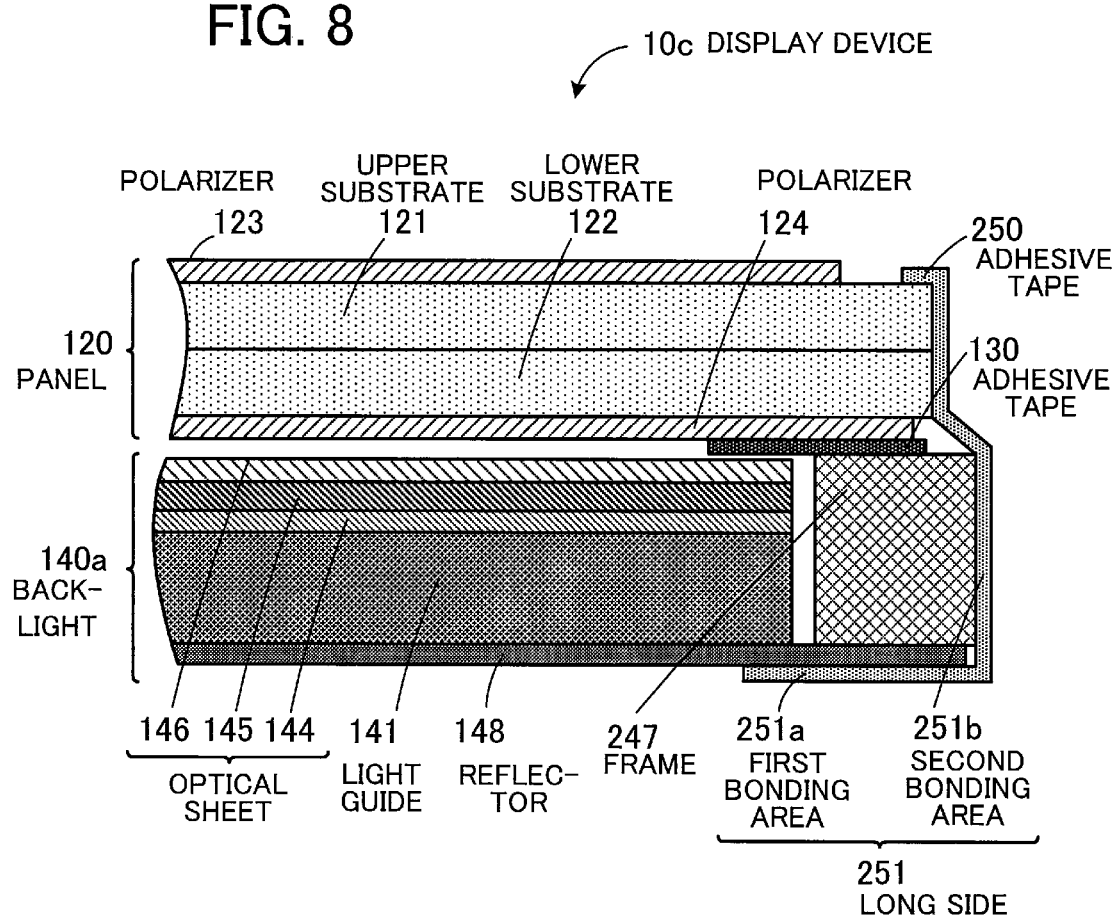

DISPLAY DEVICE

CROSS-REFERENCE TO RELATED APPLICATION

This application is based upon and claims the benefit of priority of the prior Japanese Patent Application No. 2016-134206, filed on Jul. 6, 2016, the entire contents of which are incorporated herein by reference.

FIELD

The embodiments discussed herein are related to a display device.

BACKGROUND

In recent years transmission type display devices have widely been used in smartphones, personal assistant devices (PADs), tablet computers, car navigation systems, and the like. A transmission type display device includes a liquid crystal panel and a backlight disposed (placed) on a rear surface side of the liquid crystal panel and irradiating the liquid crystal panel with light and displays an image by the use of the light with which the backlight irradiates the liquid crystal panel. With such a display device a technique for preventing light with which a backlight irradiates a liquid crystal panel from leaking out is proposed. Furthermore, with a display device a technique for fixing a backlight and a liquid crystal panel is proposed.

See, for example, U.S. Patent Application Publication No. 2015/0241731.

SUMMARY

According to an aspect, there is provided a display device including a panel, a backlight under the panel, and an adhesive tape having a light blocking property and bonded to an end face of the panel and the backlight.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an exploded perspective view of a backlight in the first embodiment;

FIGS. 5A and 5B are fragmentary sectional views of the display device according to the first embodiment;

FIGS. 6A and 6B are fragmentary sectional views of modification 1 of the display device according to the first embodiment;

FIG. 7 is a fragmentary sectional view of modification 2 of the display device according to the first embodiment;

FIG. 8 is a fragmentary sectional view of a display device according to a second embodiment;

DESCRIPTION OF EMBODIMENTS

Figure 1:
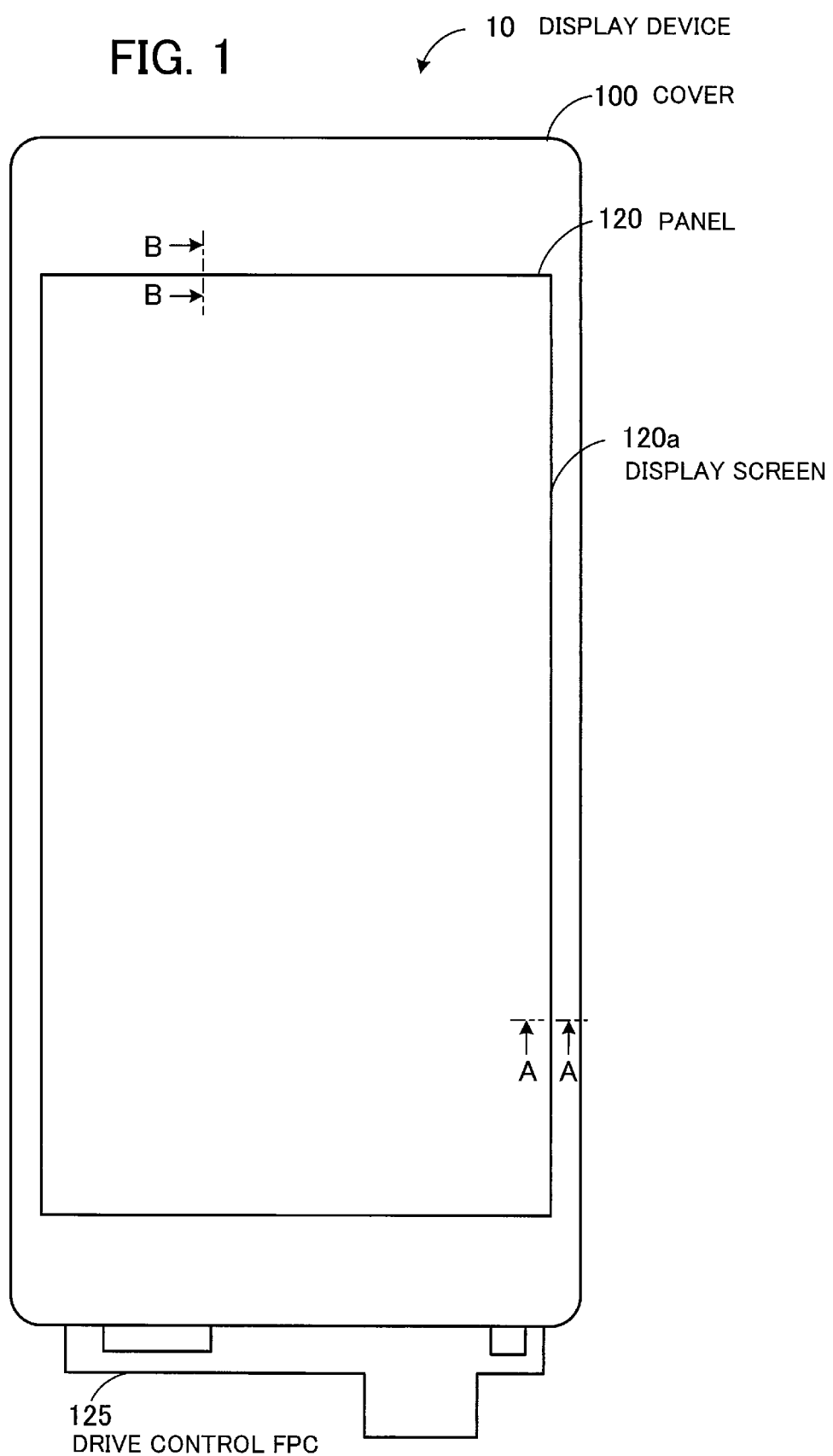
FIG. 1 is a plan view of a display device according to a first embodiment.

Embodiments will now be described with reference to the accompanying drawings.

Disclosed embodiments are simple examples. It is a matter of course that a proper change which suits the spirit of the invention and which will readily occur to those skilled in the art falls within the scope of the present invention. Furthermore, in order to make description clearer, the width, thickness, shape, or the like of each component may schematically be illustrated in the drawings compared with the real state. However, it is a simple example and the interpretation of the present invention is not restricted.

In addition, in the present invention and the drawings the same components that have already been described in previous drawings are marked with the same numerals and detailed descriptions of them may be omitted according to circumstances.

First Embodiment

Figure 2:
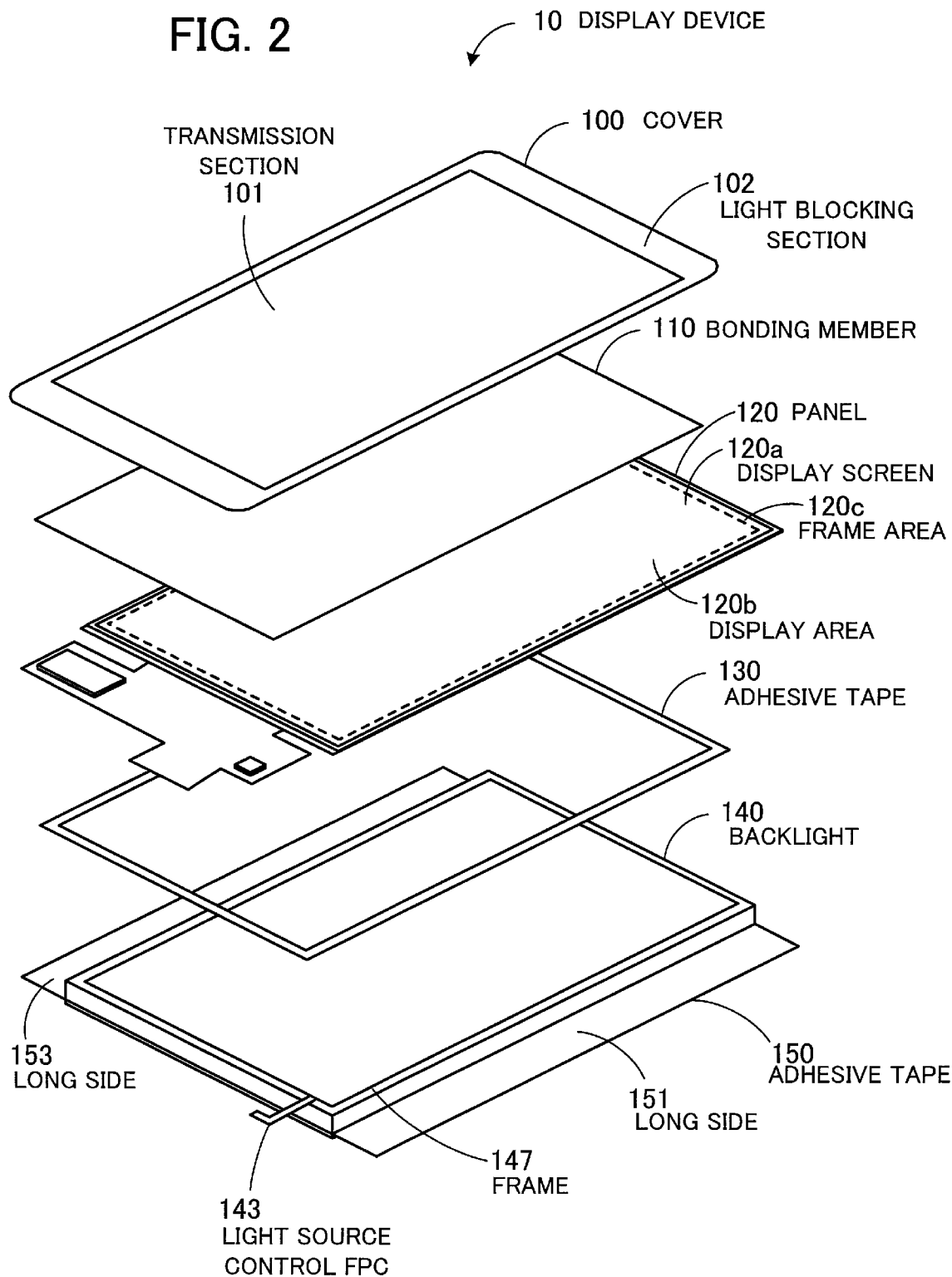
FIG. 2 is an exploded perspective view of the display device according to the first embodiment.

First a display device according to a first embodiment will be described by the use of FIGS. 1 and 2. FIG. 1 is a plan view of a display device according to a first embodiment. FIG. 1 is a plan view of a display device viewed from the side of a front surface (surface on which an image is displayed). FIG. 2 is an exploded perspective view of the display device according to the first embodiment. In the following description of each component, it is assumed that a surface on a side (upper side in FIG. 2) of the display device on which an image is displayed is a front surface and that a surface on the opposite side (lower side in FIG. 2) of the front surface is a rear surface.

As illustrated in FIG. 2, a display device 10 is a transmission type display device and includes a cover 100, a bonding member 110, a liquid crystal panel (panel, hereinafter) 120, an adhesive tape 130, a backlight 140, and an adhesive tape 150.

The cover 100 has a rectangular shape whose four corners are rounded and covers a display screen 120a, which is a front surface of the panel 120, to protect the display screen 120a. Furthermore, the size of the cover 100 formed is such that the peripheral edge (outer edge) of the cover 100 protrudes out from the peripheral edge of the panel 120 in planar view.

The cover 100 is formed by the use of a glass plate or a transparent resin. The cover 100 includes a transmission section 101 and a frame-shaped light blocking section 102 by which the perimeter of the transmission section 101 is enclosed. The transmission section 101 is an area which transmits light, and is opposed to a display area 120b of the panel 120. The light blocking section 102 is a light blocking area formed by locating a light blocking member which shields light on the rear surface side of the glass plate. The light blocking section 102 is also referred to as a frame area of the display device 10. The light blocking member may be disposed on the front surface side of the glass plate.

The bonding member 110 bonds the cover 100 and the display screen 120a of the panel 120 together. The bonding member 110 has great transparency and an adhesive property (adhesion) and is ultraviolet curing resin or the like. The bonding member 110 is formed so as to have a rectangular shape in planar view.

The panel 120 is a display unit in the shape of a flat plate which displays an image. The panel 120 includes the display area 120b on which an image is displayed, and a frame-shaped frame area 120c by which the perimeter of the display area 120b is enclosed. The panel 120 has the transmission display function of displaying (forming) an image on the display screen 120a by selectively transmitting light emitted from the backlight 140 to the display area 120b.

Figure 3:
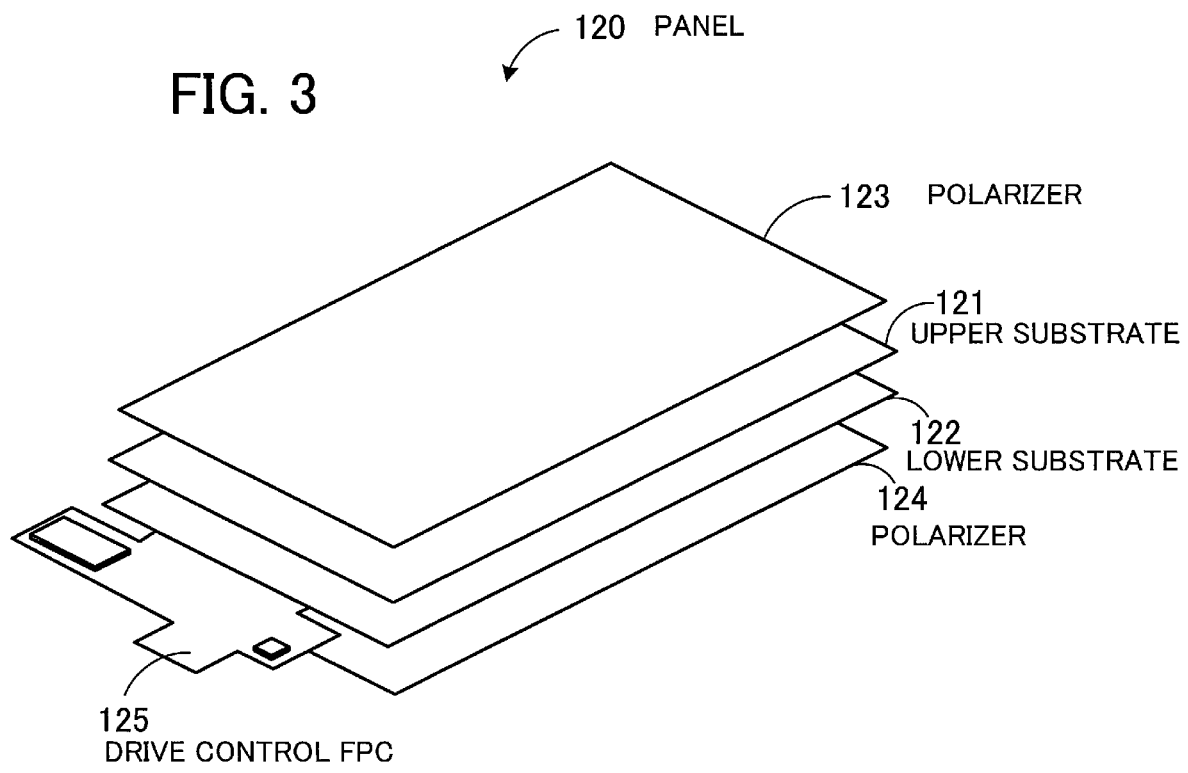
FIG. 3 is an exploded perspective view of a liquid crystal panel in the first embodiment.

The panel 120 will now be described more concretely by the use of FIG. 3. FIG. 3 is an exploded perspective view of the liquid crystal panel in the first embodiment.

The panel 120 corresponds to a lateral electric field mode as a display mode in which a lateral electric field approximately parallel to the principal plane of a substrate is mainly utilized. The panel 120 may correspond to a longitudinal electric field mode in which a longitudinal electric field approximately perpendicular to the principal plane of the substrate is mainly utilized.

The panel 120 includes an upper substrate 121, a lower substrate 122, a polarizer 123, a polarizer 124, and drive control flexible printed circuits (FPC) 125.

The upper substrate 121 and the lower substrate 122 are paired and liquid crystal is put between them. The upper substrate 121 is a flat plate having a rectangular shape. For example, red (R), green (G), and blue (B) color filters corresponding to pixels are formed on the upper substrate 121. The lower substrate 122 is a flat plate having a rectangular shape. A thin-film transistor and the like are formed on the lower substrate 122.

The polarizer 123 is stuck to the upper substrate 121 in a state in which the polarizer 123 is disposed on the front surface side of the upper substrate 121. The polarizer 123 polarizes light that is then output from the panel 120. The polarizer 124 is stuck to the lower substrate 122 in a state in which the polarizer 124 is disposed on the rear surface side of the lower substrate 122. The polarizer 124 polarizes light entering the panel 120.

The drive control FPC 125 is a circuit board on which an integrated circuit, such as an IC chip, and the like are mounted and which supplies a signal needed for driving the panel 120. The drive control FPC 125 is stuck to the lower substrate 122 and extends from one side of the lower substrate 122 in planar view. On the basis of a signal supplied from the drive control FPC 125, the panel 120 selectively transmits light emitted from the backlight 140 to the display area 120b to display an image on the display screen 120a. The description will return to FIGS. 1 and 2.

The adhesive tape 130 is placed between the panel 120 and the backlight 140. The adhesive tape 130 is a double-sided tape which bonds the panel 120 and the backlight 140 together to fix them. The adhesive tape 130 has a light blocking property by, for example, making a base material black, and has the shape of a frame. This means that a portion of the adhesive tape 130 corresponding to the display area 120b is open. That is to say, the adhesive tape 130 bonds (fixes) the panel 120 and the backlight 140 together in planar view in an area placed under the frame area 120c.

The backlight 140 is placed on the rear surface side of the panel 120 and outputs light to the rear surface of the panel 120 corresponding to the display area 120b.

The adhesive tape 150 is a tape having a light blocking property. The adhesive tape 150 is bonded to an end face of the panel 120 to bond (fix) the backlight 140 and the panel 120 together.

The backlight 140 and the adhesive tape 150 will now be described concretely by the use of FIG. 4. FIG. 4 is an exploded perspective view of the backlight in the first embodiment.

As illustrated in FIG. 4, the backlight 140 includes a light guide 141, light sources 142a to 142h, a light source control FPC 143, optical sheets 144 to 146, a frame 147, and a reflector 148.

The light sources 142a to 142h are placed on the FPC 143 in a state in which the light sources 142a to 142h are aligned. Each of the light sources 142a to 142h emits light toward an end face (hereinafter referred to as the light entrance surface) of the light guide 141. The light sources 142a to 142h are light emitting diodes (LEDs).

The light source control FPC 143 is a circuit board which supplies signals needed for the light sources 142a to 142h placed along the light entrance surface of the light guide 141. Part of the FPC 143 extends in planar view in a direction in which the distance from the light guide 141 increases. The extending portion extends outside the frame 147 in a state in which the backlight 140 is assembled. On the basis of signals supplied from the FPC 143, the backlight 140 controls the light sources 142a to 142h to adjust light entering the light guide 141. As a result, the rear surface of the panel 120 is irradiated with light of desired intensity.

The light guide 141 has a rectangular shape in planar view. The light sources 142a to 142h are opposed to the light entrance surface of the light guide 141. The light guide 141 diffuses light from each light source entering the light guide 141 from the light entrance surface and outputs light from a front surface (hereinafter referred to as the light output surface). Furthermore, the light from the light output surface enters the panel 120 from the rear surface via the optical sheets 144 to 146. The light entrance surface is placed on the side on which the drive control FPC 125 of the panel 120 is placed.

The optical sheets 144 to 146 are transparent optical members placed on the light output surface side of the light guide 141 and adjust the optical characteristics of light output from the light guide 141. For example, the optical sheet 144 is a diffuser and the optical sheets 145 and 146 are prism sheets.

The frame 147 has the shape of a rectangular frame and is placed so as to enclose the perimeters of the light guide 141, the light sources 142a to 142h, the FPC 143, and the optical sheets 144 to 146. The frame 147 is bonded to the reflector 148 with the adhesive tape 150 placed between the frame 147 and the reflector 148.

The frame 147 has a stepped shape (also referred to as an L shape). That is to say, its lower portion protrudes out from its upper portion to an inner periphery side in a cross-sectional view. Furthermore, in a state in which the backlight 140 is assembled, the lower portion of the frame 147 is opposed to the end face of the light guide 141 and the upper portion of the frame 147 is opposed to end faces of the optical sheets 144 to 146. The optical sheets 144 to 146 extend to a position where the optical sheets 144 to 146 are situated over the lower portion of the frame 147 in planar view.

The adhesive tape 150 is a double-sided tape having the shape of a rectangular frame. The adhesive tape 150 includes a pair of a short side 154 along the FPC 143 and a short side 152 parallel to the short side 154 and a pair of long sides 151 and 153 which connect end portions of the pair of short sides 152 and 154. Furthermore, the width of the pair of long sides 151 and 153 is greater than that of the pair of short sides 152 and 154. Before the display device 10 is assembled, the pair of long sides 151 and 153 extend outside the backlight 140 as illustrated in FIG. 2.

The reflector 148 is placed on the rear surface side of the light guide 141 and is placed over the entire surface of the frame 147 and the entire surface of the light guide 141 in planar view. The reflector 148 returns light from the light guide 141 to the light guide 141. The reflector 148 has the functions of reflection, diffusion, scattering, and the like. As a result, light entering the light guide 141 from each of the light sources 142a to 142h is efficiently utilized. Furthermore, the reflector 148 contributes to an increase in the intensity of light emitted from the backlight 140.

The reflector 148 is, for example, foamed polyethylene terephthalate (PET). A silver-evaporated film, a multilayer reflection film, white PET, or the like may be used as the reflector 148.

As has been described, with the backlight 140 the reflector 148 is bonded to the frame 147 with the adhesive tape 150 therebetween. A case whose upper portion is open is formed by the reflector 148 and the frame 147. Furthermore, the light guide 141, the light sources 142a to 142h, the light source control FPC 143, and the optical sheets 144 to 146 are housed in the case formed of the reflector 148 and the frame 147.

The structure of a section of the display device will now be described. FIGS. 5A and 5B are fragmentary sectional views of the display device according to the first embodiment. FIG. 5A is a sectional view taken in the direction of the arrow A-A of FIG. 1. FIG. 5B is a sectional view taken in the direction of the arrow B-B of FIG. 1. In order to simplify figures, partial sections are illustrated, excluding the cover 100 and the bonding member 110.

A section of a left side portion (see FIG. 1) of the display device 10 has the same bonding structure that a section of the A-A portion (right side portion in FIG. 1) of the display device 10 has. Furthermore, a section of a lower side portion (see FIG. 1) of the display device 10 may have the same bonding structure that a section of the B-B portion (upper side portion in FIG. 1) of the display device 10 has.

As illustrated in FIGS. 5A and 5B, with the display device 10 an end face of the backlight 140 protrudes out from an end face of the panel 120. As a result, there is a level difference between the end face of the panel 120 and the end face of the backlight 140.

As illustrated in FIG. 5A, the long side 151 of the adhesive tape 150 placed in the right side portion of the display device 10 includes a first bonding area 151a and a second bonding area 151b. The first bonding area 151a and the second bonding area 151b are integrally formed. Furthermore, with the display device 10 the first bonding area 151a and the second bonding area 151b are placed in regular positions by bending the long side 151 at the border between the first bonding area 151a and the second bonding area 151b. Positions where the first bonding area 151a and the second bonding area 151b are placed will now be described concretely.

The first bonding area 151a is placed between the frame 147 and the reflector 148 to bond (fix) the frame 147 and the reflector 148 together.

An end portion of the first bonding area 151a on the opposite side of the second bonding area 151b is placed in a position where the frame 147 is situated in planar view over the end portion of the first bonding area 151a on the opposite side of the second bonding area 151b. Furthermore, the width of the first bonding area 151a formed is set so as to meet needed bonding strength (fixing strength).

The second bonding area 151b includes a bonding portion 151b1 on the panel side bonded to the end face of the panel 120, a bonding portion 151b2 on the light guide side bonded to the end face of the light guide 141, and a connection portion 151b3 which connects the bonding portion 151b1 and the bonding portion 151b2. Furthermore, the connection portion 151b3 is placed so as to fall from the bonding portion 151b1 to the bonding portion 151b2. As a result, the second bonding area 151b covers the level difference between the end face of the panel 120 and the end face of the backlight 140. Furthermore, the connection portion 151b3 of the second bonding area 151b is opposed to the frame 147 of the backlight 140 and the polarizer 124 with a determined clearance (space) therebetween. In view of these respects, it is desirable to eliminate adhesive force from an inner face of the connection portion 151b3 opposed to the frame 147 and the like. However, there may be cases where adhesive force is not eliminated from the inner face of the connection portion 151b3.

In addition, the second bonding area 151b extends from end faces of the upper substrate 121 and the lower substrate 122 (hereinafter referred to as the pair of substrates 121 and 122). A portion of the second bonding area 151b extending from the end faces of the pair of substrates 121 and 122 is bent along the pair of substrates 121 and 122. Furthermore, an end face of the portion of the second bonding area 151b bent along the pair of substrates 121 and 122 is opposed to an end face of the polarizer 123. In this state, the portion of the second bonding area 151b bent along the pair of substrates 121 and 122 is bonded to a peripheral edge portion (portion not covered with the polarizer 123) of a front surface of the upper substrate 121.

The portion of the second bonding area 151b bent along the pair of substrates 121 and 122 is equal to or smaller than the polarizer 123 in thickness.

As illustrated in FIG. 5B, on the other hand, the short side 152 of the adhesive tape 150 placed in the upper side portion of the display device 10 includes a first bonding area 152a.

The first bonding area 152a is placed between the frame 147 and the reflector 148 to bond (fix) the frame 147 and the reflector 148 together.

The first bonding area 152a is placed in a position where the frame 147 is placed in planar view over the whole of the first bonding area 152a. Furthermore, the width of the first bonding area 152a formed is set so as to meet needed bonding strength (fixing strength).

As has been described, with the display device 10 the adhesive tape 150 having a light blocking property is bonded to the end face of the panel 120. This prevents light from leaking out from the end face of the panel 120.

Furthermore, the adhesive tape 150 is bonded not only to the end face of the panel 120 but also to the front surface of the upper substrate 121. This increases a bonding area. In addition, the adhesive tape 150 is bonded to the panel 120 not only in the vertical direction but also in the horizontal direction of FIGS. 5A and 5B. As a result, the adhesive tape 150 is difficult to peel from the panel 120.

Moreover, with the display device 10 the panel 120 and the backlight 140 are bonded together (fixed) not only with the adhesive tape 130 but also with the adhesive tape 150. Accordingly, the panel 120 and the backlight 140 are bonded together (fixed) more firmly. As a result, a positional deviation does not occur between the panel 120 and the backlight 140, that is to say, there is no clearance between the panel 120 and the backlight 140. This prevents light from leaking out.

Furthermore, an outer peripheral face of the frame 147 and the end face of the panel 120 are covered with the adhesive tape 150. Accordingly, the end face of the panel 120 is protected and impact resistance is improved.

In addition, the outer peripheral face of the frame 147 and the end face of the panel 120 are covered with the adhesive tape 150. This prevents dust, moisture, or the like from entering, and improves reliability.

As illustrated in FIGS. 5A and 5B, with the display device 10 the optical sheets 144 to 146 are opposed to the adhesive tape 130, but the optical sheets 144 to 146 are not bonded to the adhesive tape 130. That is to say, there is clearance (space) between the optical sheets 144 to 146 and the adhesive tape 130. The optical sheets 144 to 146 are bonded to the panel 120, the light guide 141, and the like in the lower side portion (on the light source side) of the display device 10, but the optical sheets 144 to 146 are not bonded to the panel 120, the light guide 141, or the like in the three remaining side portions (right side, left side, and upper side portions) of the display device 10. As a result, the optical sheets 144 to 146 accommodate thermal expansion or contraction and the occurrence of a display degradation phenomenon, such as moire, is prevented. Furthermore, because the optical sheets 144 to 146 are opposed to the adhesive tape 130, end portions of the optical sheets 144 to 146 look better.

The description has been given on the assumption that each of the left side portion and the right side portion adjacent to the lower side portion of the display device 10 illustrated in FIG. 1 in which the light source control FPC 143 is placed has the structure illustrated in FIG. 5A. However, the upper side portion of the display device 10 illustrated in FIG. 1 may also have the same structure as that of the section of the A-A portion.

Modification 1

Modification 1 will now be described by the use of FIGS. 6A and 6B. FIGS. 6A and 6B are fragmentary sectional views of modification 1 of the display device according to the first embodiment. Partial sections illustrated in FIGS. 6A and 6B correspond to the partial sections illustrated in FIGS. 5A and 5B respectively.

As illustrated in FIGS. 6A and 6B, with a display device 10a which is modification 1 of the display device 10 according to the first embodiment, the adhesive tape 130 used in the display device 10 is removed. Furthermore, there is no space between a polarizer 124 and an optical sheet 146. A backlight 140 and a panel 120 are fixed in a state in which the polarizer 124 is placed on the optical sheet 146.

Modification 1 of the display device 10 has been described. By removing the adhesive tape 130 in this way, the display device 10a is made thinner than the display device 10. In addition, the display device 10a having a narrow frame is realized.

With the display device 10 illustrated in FIGS. 5A and 5B, usually a display area is set by setting a determined clearance inside an area situated over the adhesive tape 130 in planar view. With the display device 10a illustrated in FIGS. 6A and 6B, on the other hand, the adhesive tape 130 is removed. Therefore, unlike the display device 10, there is no need to meet the following restriction. A display area is set inside an area situated over the adhesive tape 130.

As a result, with the display device 10a the distance from a peripheral edge of a display screen 120a of the panel 120 to a display area 120b is short compared with the display device 10. Therefore, the display device 10a having a narrow frame is realized.

With the display device 10a the backlight 140 and the panel 120 are bonded together (fixed) with an adhesive tape 150. Accordingly, even if the adhesive tape 130 is removed, bonding strength (fixing strength) is ensured.

Of course it is understood that other functions and effects which are obtained by the situation described in the first embodiment and which are clear from the specification or which are conceivable by those skilled in the art according to circumstances are realized by the present disclosure.

Modification 2

Modification 2 will now be described by the use of FIG. 7. FIG. 7 is a fragmentary sectional view of modification 2 of the display device according to the first embodiment. A partial section illustrated in FIG. 7 corresponds to the partial section illustrated in FIG. 5A.

As illustrated in FIG. 7, with a display device 10b which is modification 2 of the display device 10 according to the first embodiment, a long side 151 of an adhesive tape 150 includes a second bonding area 151b. A portion of the second bonding area 151b extending from end faces of a pair of substrates 121 and 122 is not bent along the pair of substrates 121 and 122 but extends. The display device 10b may have a structure in which an end face of the second bonding area 151b is leveled with a front surface of the upper substrate 121 or a structure in which an end face of the second bonding area 151b is bonded to the end face of the upper substrate 121 in a position nearer to the lower substrate 122 than to the front surface of the upper substrate 121.

Modification 2 of the display device 10 has been described. Of course it is understood that other functions and effects which are obtained by the situation described in the first embodiment and which are clear from the specification or which are conceivable by those skilled in the art according to circumstances are realized by the present disclosure.

Second Embodiment

A second embodiment differs from the first embodiment in the disposition of an adhesive tape (position where an adhesive tape is placed). Description will now be given with importance attached especially to the differences between the first embodiment and a second embodiment. A second embodiment will be described concretely by the use of FIG. 8. FIG. 8 is a fragmentary sectional view of a display device according to a second embodiment. FIG. 8 illustrates a partial section of a display device according to a second embodiment corresponding to the partial section illustrated in FIG. 5A.

In order to simplify a figure, a partial section is illustrated, excluding a cover 100 and a bonding member 110. A section of a left side portion of a display device according to a second embodiment has the same bonding structure that a section of a right side portion of a display device according to a second embodiment has.

With a display device 10c according to a second embodiment a frame 247 whose section has a simple shape, that is to say, whose inner periphery is flattened is used in place of the frame 147 which is used in the display device 10 according to the first embodiment and whose section has a complex shape. Furthermore, the frame 247 is placed in a state in which its inner periphery is opposed to an end face of a light guide 141 and end faces of optical sheets 144 to 146.

In addition, an adhesive tape 250 is used in place of the adhesive tape 150 used in the display device 10 according to the first embodiment. The adhesive tape 250 is a single-sided tape having adhesive force only on one face.

As illustrated in FIG. 8, a long side 251 of the adhesive tape 250 placed in the right side portion of the display device 10c includes a first bonding area 251a and a second bonding area 251b. The first bonding area 251a and the second bonding area 251b are integrally formed. Furthermore, with the display device 10c the first bonding area 251a and the second bonding area 251b are placed in regular positions by bending the long side 251 at the border between the first bonding area 251a and the second bonding area 251b. Positions where the first bonding area 251a and the second bonding area 251b are placed will now be described concretely.

The first bonding area 251a is bonded to a rear surface of the reflector 148.

The second bonding area 251b is bonded to the end face of the panel 120 and an outer peripheral face of the frame 247.

Furthermore, the second bonding area 251b extends from end faces of a pair of substrates 121 and 122. A portion of the second bonding area 251b extending from the end faces of the pair of substrates 121 and 122 is bent along the pair of substrates 121 and 122. In addition, an end face of the portion of the second bonding area 251b bent along the pair of substrates 121 and 122 is opposed to an end face of the polarizer 123. In this state, the portion of the second bonding area 251b bent along the pair of substrates 121 and 122 is bonded to a peripheral edge portion (portion not covered with a polarizer 123) of a front surface of the upper substrate 121.

The portion of the second bonding area 251b bent along the pair of substrates 121 and 122 is equal to or smaller than the polarizer 123 in thickness.

As has been described, with the display device 10c the adhesive tape 250 is bonded to the rear surface of the reflector 148 and the outer peripheral face of the frame 247. As a result, restrictions on the shape of the frame 247 are reduced. Usually the width of a frame formed is set so as to ensure a bonding area which meet desired bonding strength. In the first embodiment, for example, the frame 147 is bonded to the panel 120 on the upper end side and is bonded to the reflector 148 on the lower end side. Accordingly, there is a need to form the frame 147 so as to make the area of an upper end face of the frame 147 larger than or equal to an area which meets bonding strength between the frame 147 and the panel 120 and so as to make the area of an lower end face of the frame 147 larger than or equal to an area which meets bonding strength between the frame 147 and the reflector 148.

In addition, with a display device usually a display area is set by setting a determined clearance inside an area situated over a frame in planar view. Accordingly, as illustrated in FIGS. 5A and 5B, for example, in order to realize a narrow width (narrow frame) while ensuring a bonding area on each of the upper end face and the lower end face of the frame 147, the frame 147 is formed so as to have a stepped shape. That is to say, its lower portion protrudes out from its upper portion to an inner periphery side in a cross-sectional view.

With the display device 10c, on the other hand, the adhesive tape 250 is bonded to the rear surface of the reflector 148 and the outer peripheral face of the frame 247. As a result, the frame 247 is formed so as to make the area of an upper end face of the frame 247 an area which meets bonding strength between the frame 247 and the panel 120. Accordingly, the frame 247 may be formed so as to have, for example, a rectangular shape (inner periphery is flattened) in a cross-sectional view as illustrated in FIG. 8.

As has been described, there are no restrictions on the area of a lower end face of the frame 247. As a result, with the display device 10c the width of the frame 247 may be made smaller than that of the frame 147. Accordingly, a display device having a narrow frame is realized.

In addition, the first bonding area 251a of the long side 251 of the adhesive tape 250 is bonded to the rear surface of the reflector 148. As a result, even if the first bonding area 251a is situated on the inner periphery side of the frame 247 (in an area under a display area, for example) in planar view, the first bonding area 251a does not exert influence on display. Accordingly, with the display device 10c a bonding area between the first bonding area 251a and the reflector 148 may be made large. This makes it difficult to peel the adhesive tape 250 from the reflector 148.

With the display device 10c a backlight 140a and the panel 120 are bonded together (fixed) with the adhesive tape 250. Therefore, as with modification 1 in the first embodiment, the display device 10c having a narrow frame is realized by removing an adhesive tape 130. An upper side portion of the display device according to the second embodiment may also have the same structure as the right side portion illustrated in FIG. 8 has.

The second embodiment has been described. The same functions and effects are also obtained for matters in the second embodiment which are the same as those in the above first embodiment.

Furthermore, of course it is understood that other functions and effects which are obtained by the situation described in the second embodiment and which are clear from the specification or which are conceivable by those skilled in the art according to circumstances are realized by the present disclosure.

Third Embodiment

Figure 9:
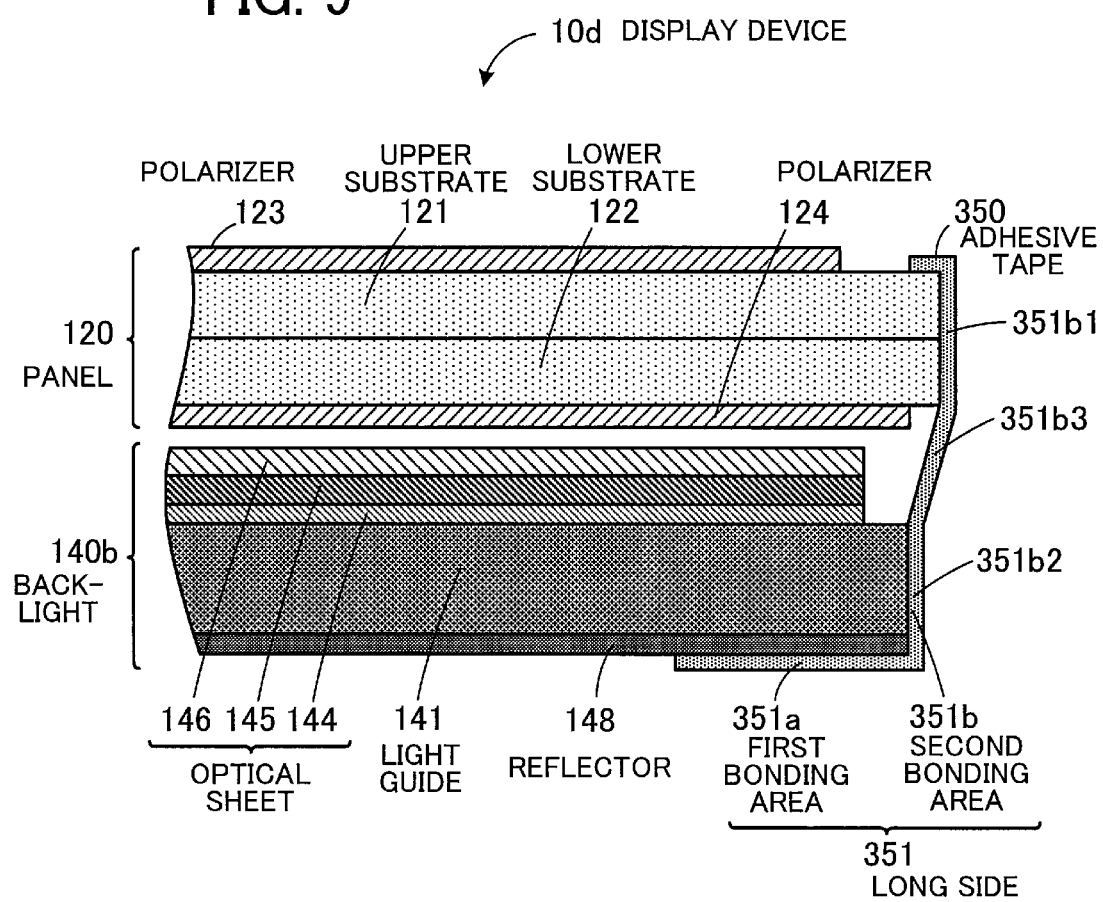
FIG. 9 is a fragmentary sectional view of a display device according to a third embodiment.

A third embodiment differs from the first embodiment in the disposition of an adhesive tape (position where an adhesive tape is placed) and the absence of a frame. Description will now be given with importance attached especially to the differences between the first embodiment and a third embodiment. A third embodiment will be described concretely by the use of FIG. 9. FIG. 9 is a fragmentary sectional view of a display device according to a third embodiment. FIG. 9 illustrates a partial section of a display device according to a third embodiment corresponding to the partial section illustrated in FIG. 5A.

In order to simplify a figure, a partial section is illustrated, excluding a cover 100 and a bonding member 110. A section of a left side portion of a display device according to a third embodiment has the same bonding structure that a section of a right side portion of a display device according to a third embodiment has.

With a backlight 140b of a display device 10d according to a third embodiment the frame 147 used in the display device 10 according to the first embodiment is removed. Furthermore, with the display device 10d the adhesive tape 130 used in the display device 10 according to the first embodiment is removed. In addition, an adhesive tape 350 is used in place of the adhesive tape 150. The adhesive tape 350 is a single-sided tape having adhesive force only on one face. In addition, an end face of a panel 120 protrudes out from an end face of the backlight 140b. As a result, there is a level difference between the end face of the panel 120 and the end face of the backlight 140b.

As illustrated in FIG. 9, a long side 351 of the adhesive tape 350 placed in the right side portion of the display device 10d includes a first bonding area 351a and a second bonding area 351b. The first bonding area 351a and the second bonding area 351b are integrally formed. Furthermore, with the display device 10d the first bonding area 351a and the second bonding area 351b are placed in regular positions by bending the long side 351 at the border between the first bonding area 351a and the second bonding area 351b. Positions where the first bonding area 351a and the second bonding area 351b are placed will now be described concretely.

The first bonding area 351a is placed on the rear surface side of a reflector 148 and is bonded to a rear surface of the reflector 148.

The second bonding area 351b includes a bonding portion 351b1 on the panel side bonded to the end face of the panel 120, a bonding portion 351b2 on the light guide side bonded to an end face of a light guide 141, and a connection portion 351b3 which connects the bonding portion 351b1 and the bonding portion 351b2. Furthermore, the connection portion 351b3 is placed so as to fall from the bonding portion 351b1 to the bonding portion 351b2. As a result, the connection portion 351b3 covers the level difference between the end face of the panel 120 and the end face of the backlight 140b. Furthermore, the connection portion 351b3 of the second bonding area 351b is opposed to optical sheets 144 to 146 of the backlight 140b and a polarizer 124 with a determined clearance (space) therebetween. In view of these respects, it is desirable to eliminate adhesive force from an inner face of the connection portion 351b3 opposed to the optical sheets 144 to 146 and the like. However, there may be cases where adhesive force is not eliminated from the inner face of the connection portion 351b3.

In addition, the second bonding area 351b extends from end faces of a pair of substrates 121 and 122. A portion of the second bonding area 351b is bent along the pair of substrates 121 and 122. Furthermore, an end face of the portion of the second bonding area 351b is opposed to an end face of the polarizer 123. In this state, the portion of the second bonding area 351b bent along the pair of substrates 121 and 122 is bonded to a peripheral edge portion (portion not covered with a polarizer 123) of a front surface of the upper substrate 121.

The portion of the second bonding area 351b bent along the pair of substrates 121 and 122 is equal to or smaller than the polarizer 123 in thickness.

As has been described, with the display device 10d the adhesive tape 130 and the frame 147 used in the display device 10 according to the first embodiment are removed. Accordingly, when a display area is set, there is no need to meet the following restriction. A display area is set in planar view inside an area situated over the frame 147 or the adhesive tape 130. As a result, the distance from a peripheral edge of a display screen 120a of the panel 120 to a display area 120b is decreased. Therefore, a display device having a narrow frame is realized.

An upper side portion of the display device according to the third embodiment may also have the same structure as the right side portion illustrated in FIG. 9 has.

The third embodiment has been described. The same functions and effects are also obtained for matters in the third embodiment which are the same as those in each of the above embodiments.

Furthermore, of course it is understood that other functions and effects which are obtained by the situation described in the third embodiment and which are clear from the specification or which are conceivable by those skilled in the art according to circumstances are realized by the present disclosure.

Fourth Embodiment

A fourth embodiment differs from the first embodiment in the disposition of an adhesive tape (position where an adhesive tape is placed) and the presence of a case of a backlight. Description will now be given with importance attached especially to the differences between the first embodiment and a fourth embodiment. A fourth embodiment will be described concretely by the use of FIGS. 10A and 10B.

Figure 10A:
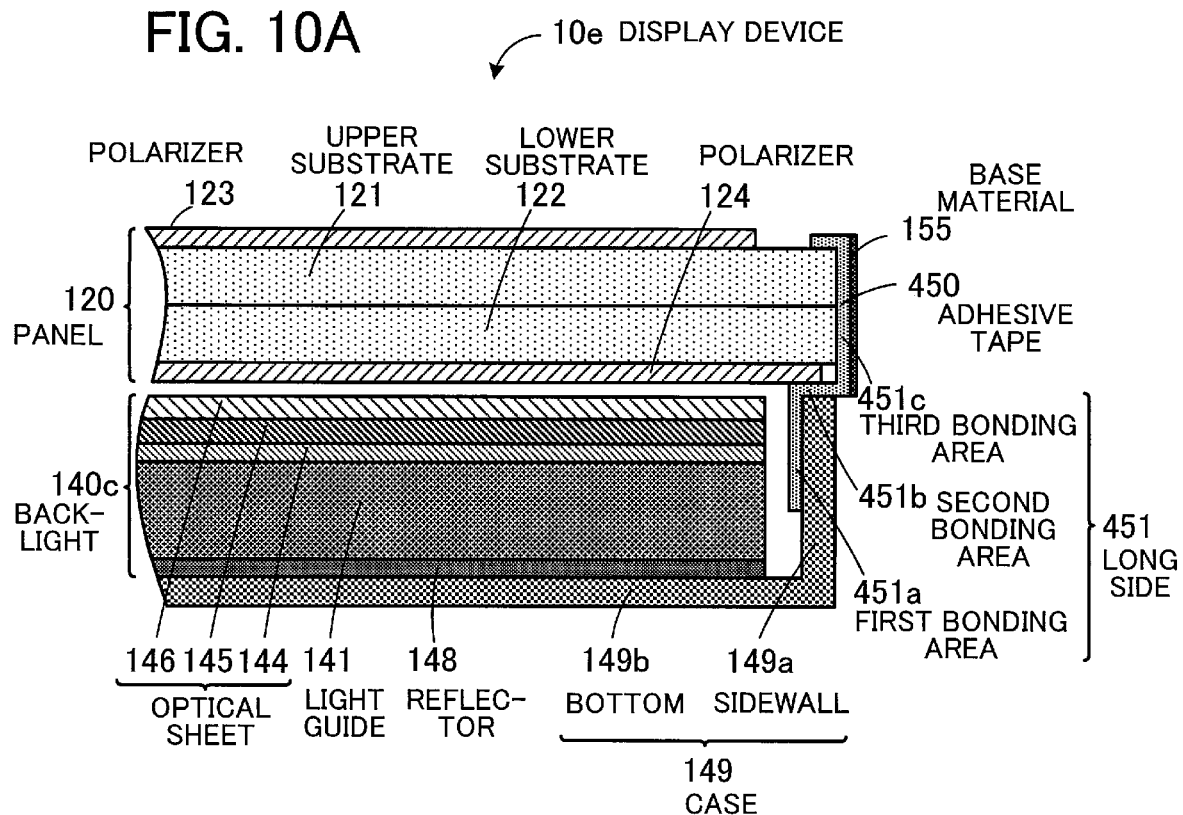
FIGS. 10A and 10B are fragmentary sectional views of a display device according to a fourth embodiment.
Figure 10B:
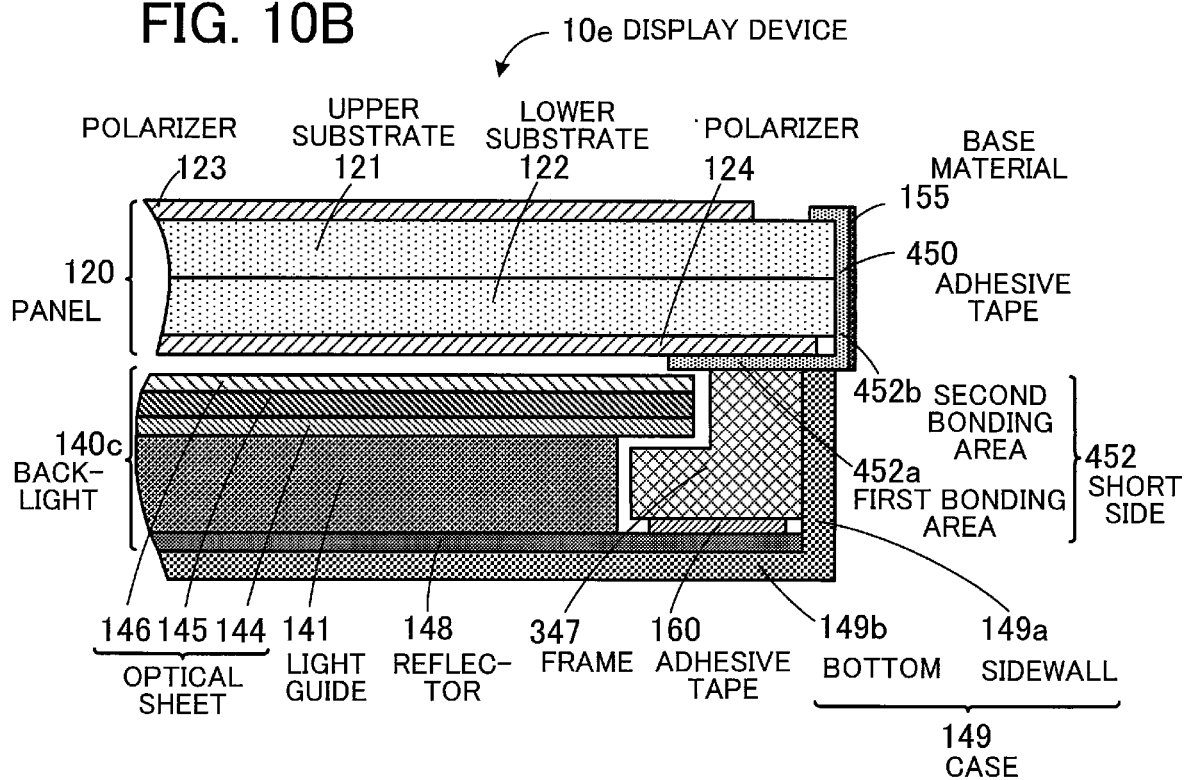

FIGS. 10A and 10B are fragmentary sectional views of a display device according to a fourth embodiment. FIG. 10A illustrates a partial section of a display device according to a fourth embodiment corresponding to the partial section illustrated in FIG. 5A. FIG. 10B illustrates a partial section of a display device according to a fourth embodiment corresponding to the partial section illustrated in FIG. 5B. In order to simplify figures, partial sections are illustrated, excluding a cover 100 and a bonding member 110.

A section of a left side portion of a display device according to a fourth embodiment has the same bonding structure that a section of a right side portion of a display device according to a fourth embodiment has.

With a display device 10e according to a fourth embodiment a backlight 140c includes a case 149. The case 149 includes a bottom 149b over which various optical members are placed and a sidewall 149a erected from a peripheral edge portion of the bottom 149b in a position situated under a panel 120 in planar view. Furthermore, the adhesive tape 130 used in the display device 10 according to the first embodiment is removed. In addition, the frame 147 used in the display device 10 is removed. Moreover, a frame 347 is newly placed opposite an end face of a light guide 141 and end faces of optical sheets 144 to 146.

With the display device 10e the frame 347 is bonded to a reflector 148 with an adhesive tape 160 placed between the frame 347 and the reflector 148. Furthermore, the frame 347 has a stepped shape (also referred to as an L shape). That is to say, its lower portion protrudes out from its upper portion to an inner periphery side in a cross-sectional view. In addition, a lower portion of the frame 347 is opposed to the end face of the light guide 141 and an upper portion of the frame 347 is opposed to the end faces of the optical sheets 144 to 146. The optical sheets 144 to 146 are placed so as to extend to a position where they are situated over the lower portion of the frame 347 in planar view.

Moreover, with the display device 10e an adhesive tape 450 is used in place of the adhesive tape 150 used in the display device 10 according to the first embodiment. The adhesive tape 450 is a double-sided tape having adhesive force on both faces.

As illustrated in FIG. 10A, a long side 451 of the adhesive tape 450 placed in the right side portion of the display device 10e extends through a space between the panel 120 and an end face of the sidewall 149a opposed to the panel 120 to the inside of the case 149. The long side 451 of the adhesive tape 450 includes a first bonding area 451a, a second bonding area 451b, and a third bonding area 451c. The first bonding area 451a, the second bonding area 451b, and the third bonding area 451c are integrally formed. Furthermore, with the display device 10e each bonding area of the long side 451 is placed in a regular position by bending the long side 451 at the borders between the bonding areas. A position where each bonding area is placed will now be described concretely.

The first bonding area 451a is placed in a position opposite an inner peripheral face (inner wall face) of the sidewall 149a of the case 149 and is bonded to the inner peripheral face.

Furthermore, the first bonding area 451a is opposed to the end faces of the light guide 141 and the optical sheets 144 to 146 of the backlight 140c with a determined clearance (space) therebetween. In view of this respect, it is desirable to eliminate adhesive force from a face of the first bonding area 451a opposed to each component of the backlight 140c. However, there may be cases where adhesive force is not eliminated from the face of the first bonding area 451a opposed to each component of the backlight 140c.

The second bonding area 451b is placed between a polarizer 124 (panel 120) and the end face of the sidewall 149a opposed to the polarizer 124, and bonds the panel 120 and the case 149 together. Accordingly, in order to ensure a bonding area (bonding strength), the polarizer 124 is placed in the right side portion of the display device 10e so as to protrude out on the outer periphery side of a polarizer 123.

The third bonding area 451c is placed in a position opposite an end face of the panel 120 and one face of the third bonding area 451c is bonded to the end face of the panel 120. Furthermore, a base material 155 is bonded to the other face of the third bonding area 451c in a position corresponding to the end face of the panel 120.

In addition, the third bonding area 451c extends from end faces of a pair of substrates 121 and 122. A portion of the third bonding area 451c is bent along the pair of substrates 121 and 122. Furthermore, an end face of the portion of the third bonding area 451c is opposed to an end face of the polarizer 123. In this state, the portion of the third bonding area 451c bent along the pair of substrates 121 and 122 is bonded to a peripheral edge portion (portion not covered with the polarizer 123) of a front surface of the upper substrate 121.

The portion of the third bonding area 451c bent along the pair of substrates 121 and 122 is equal to or smaller than the polarizer 123 in thickness.

As illustrated in FIG. 10B, on the other hand, a short side 452 of the adhesive tape 450 placed in the upper side portion of the display device 10e extends through a space between the panel 120 and an end face of the sidewall 149a opposed to the panel 120 to the inside of the case 149. The short side 452 includes a first bonding area 452a and a second bonding area 452b. The first bonding area 452a and the second bonding area 452b are integrally formed. Furthermore, with the display device 10e the first bonding area 452a and the second bonding area 452b are placed in regular positions by bending the short side 452 at the border between the first bonding area 452a and the second bonding area 452b. Positions where the first bonding area 452a and the second bonding area 452b are placed will now be described concretely.

The first bonding area 452a is placed between the polarizer 124 (panel 120) and an end face of the sidewall 149a opposed to the polarizer 124, between the polarizer 124 and an end face of the frame 347 opposed to the polarizer 124, and between the polarizer 124 and the optical sheets 144 to 146. Furthermore, the first bonding area 452a bonds together the polarizer 124 and the end faces of the sidewall 149a and the frame 347 opposed to the polarizer 124. Accordingly, in order to ensure a bonding area (bonding strength), the polarizer 124 is placed in the upper side portion of the display device 10e so as to protrude out on the outer periphery side of a polarizer 123.

The optical sheets 144 to 146 are opposed to the first bonding area 452a, but the optical sheets 144 to 146 are not bonded to the first bonding area 452a. That is to say, there is clearance (space) between the optical sheets 144 to 146 and the first bonding area 452a. The optical sheets 144 to 146 are bonded to the panel 120, the light guide 141, and the like in the lower side portion (on the light source side) of the display device 10e, but the optical sheets 144 to 146 are not bonded to the panel 120, the light guide 141, or the like in the three remaining side portions (right side, left side, and upper side portions) of the display device 10e. As a result, the optical sheets 144 to 146 accommodate thermal expansion or thermal contraction and the occurrence of a display degradation phenomenon, such as moire, is prevented.

The second bonding area 452b is placed in a position opposite an end face of the panel 120 and one face of the second bonding area 452b is bonded to the end face of the panel 120. Furthermore, a base material 155 is bonded to the other face of the second bonding area 452b in a position corresponding to the end face of the panel 120.

In addition, the second bonding area 452b extends from end faces of the pair of substrates 121 and 122. A portion of the second bonding area 452b is bent along the pair of substrates 121 and 122. Furthermore, an end face of the portion of the second bonding area 452b is opposed to an end face of the polarizer 123. In this state, the portion of the second bonding area 452b bent along the pair of substrates 121 and 122 is bonded to a peripheral edge portion (portion not covered with the polarizer 123) of the front surface of the upper substrate 121.

The portion of the second bonding area 452b bent along the pair of substrates 121 and 122 is equal to or smaller than the polarizer 123 in thickness.

As has been described, with the display device 10e, the frame 147 and the adhesive tape 130 used in the display device 10 according to the first embodiment are removed and only the adhesive tape 450 is used for bonding (fixing) the panel 120 and the backlight 140c together.

As a result, when a display area 120b of the display device 10e is set, there is no need to meet the following restriction. The display area 120b is set in planar view inside an area situated over the frame 147 or the adhesive tape 130. Accordingly, the distance from a peripheral edge of a display screen 120a to the display area 120b is decreased. As a result, a display device having a narrow frame is realized.

In addition, as illustrated in FIGS. 5A and 5B, with the display device 10 according to the first embodiment the bonding area of the adhesive tape 130 is ensured in the width direction of the display device 10 (in the horizontal direction of FIG. 5A) in order to bond (fix) the panel 120 and the backlight 140 together with determined bonding strength. On the other hand, the bonding area of the adhesive tape 450 between the panel 120 and the backlight 140c is ensured in the thickness direction of the display device 10e (in the vertical direction of FIG. 10A) in the left or right side portion of the display device 10e.

Because a bonding area is ensured in this way in the thickness direction of the display device 10e, distance over which the adhesive tape 450 extends in planar view is reduced in the left or right side portion of the display device 10e. As a result, a frame area narrows and a display device having a narrow frame is realized.

In addition, because the display device 10e is housed in the case 149, the impact resistance of the backlight 140c is improved.

The description has been given on the assumption that the upper side portion of the display device 10e according to the fourth embodiment has the structure illustrated in FIG. 10B. However, the upper side portion of the display device 10e according to the fourth embodiment may also have the same structure that is illustrated in FIG. 10A. Furthermore, the left or right side portion of the display device 10e according to the fourth embodiment may have the same structure that is illustrated in FIG. 10B.

The fourth embodiment has been described. The same functions and effects are also obtained for matters in the fourth embodiment which are the same as those in each of the above embodiments.

Furthermore, of course it is understood that other functions and effects which are obtained by the situation described in the fourth embodiment and which are clear from the specification or which are conceivable by those skilled in the art according to circumstances are realized by the present disclosure.

Fifth Embodiment

A fifth embodiment differs from the fourth embodiment in that an adhesive tape is bonded to an outer peripheral face (outer wall face) of a case. Description will now be given with importance attached especially to the differences between the fourth embodiment and a fifth embodiment. A fifth embodiment will be described concretely by the use of FIG. 11.

Figure 11:
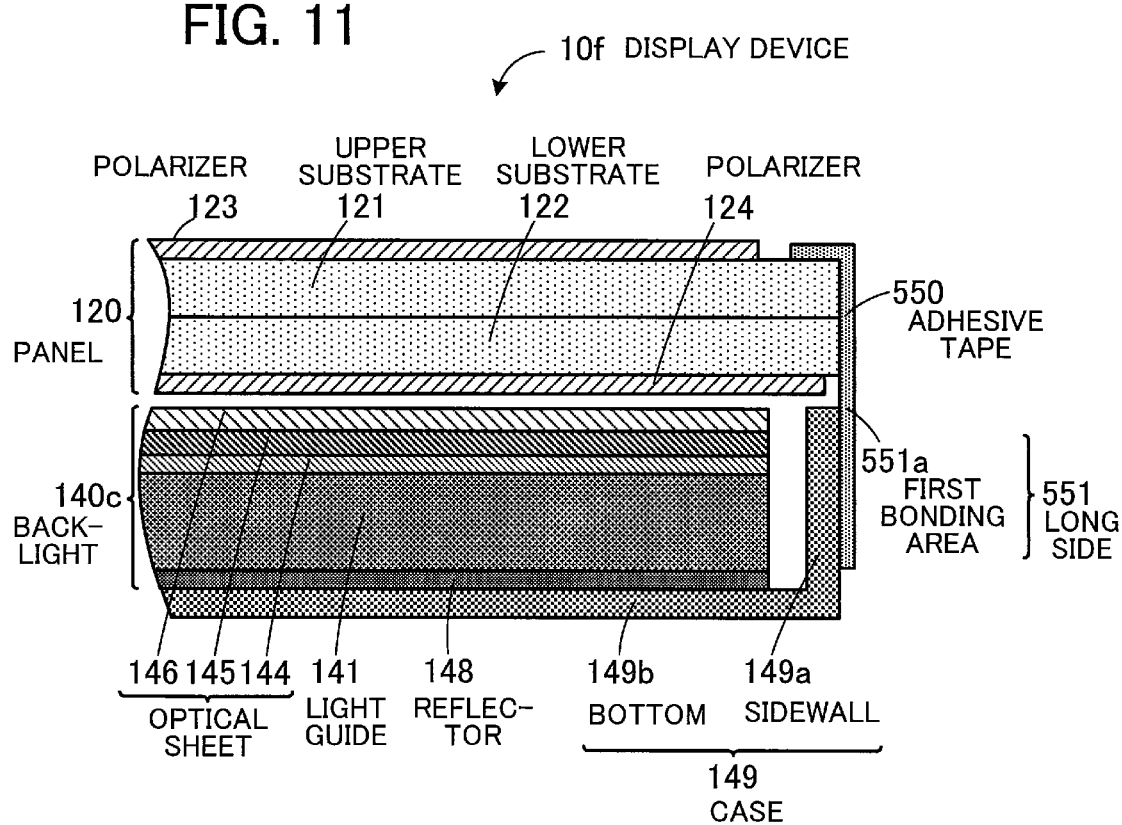
FIG. 11 is a fragmentary sectional view of a display device according to a fifth embodiment.

FIG. 11 is a fragmentary sectional view of a display device according to a fifth embodiment. FIG. 11 illustrates a partial section of a display device according to a fifth embodiment corresponding to the partial section illustrated in FIG. 10A. In order to simplify a figure, a partial section is illustrated, excluding a cover 100 and a bonding member 110.

A section of a left side portion of a display device according to a fifth embodiment has the same bonding structure that a section of a right side portion of a display device according to a fifth embodiment has.

With a display device 10f according to a fifth embodiment an adhesive tape 550 is used in place of the adhesive tape 450 used in the display device 10e according to the fourth embodiment. The adhesive tape 550 is a single-sided tape having adhesive force only on one face.

As illustrated in FIG. 11, a long side 551 of the adhesive tape 550 placed in the right side portion of the display device 10f includes a first bonding area 551a.

The first bonding area 551a is placed in a position opposite an end face of a panel 120 and an outer peripheral face of a sidewall 149a of a case 149 and is bonded to the end face of the panel 120 and the outer peripheral face of the sidewall 149a.

Furthermore, the first bonding area 551a extends from end faces of a pair of substrates 121 and 122. A portion of the first bonding area 551a is bent along the pair of substrates 121 and 122. Furthermore, an end face of the portion of the first bonding area 551a is opposed to an end face of the polarizer 123. In this state, the portion of the first bonding area 551a bent along the pair of substrates 121 and 122 is bonded to a peripheral edge portion (portion not covered with a polarizer 123) of a front surface of the upper substrate 121.

The portion of the first bonding area 551a bent along the pair of substrates 121 and 122 is equal to or smaller than the polarizer 123 in thickness.

The first bonding area 551a may extend downward from the outer peripheral face of the sidewall 149a and a portion of the first bonding area 551a extending from the outer peripheral face of the sidewall 149a may be bent along the case 149 to place it on a face of a bottom 149b of the case 149 opposite to a face on which a backlight 140c is placed. By doing so, a bonding area between the adhesive tape 550 and the case 149 of the display device 10f is increased. This makes it difficult to peel the adhesive tape 550 from the case 149. Even in this case, the adhesive tape 550 does not exert influence on display because the adhesive tape 550 is placed on the face of the bottom 149b opposite to the face on which the backlight 140c is placed.

An upper side portion of the display device 10f according to the fifth embodiment may also have the same structure that is illustrated in FIG. 11.

The fifth embodiment has been described. The same functions and effects are also obtained for matters in the fifth embodiment which are the same as those in each of the above embodiments.

Furthermore, of course it is understood that other functions and effects which are obtained by the situation described in the fifth embodiment and which are clear from the specification or which are conceivable by those skilled in the art according to circumstances are realized by the present disclosure.

The display devices described in the above embodiments may be incorporated in various electronic apparatus such as smartphones, tablet terminals, portable telephones, notebook-sized PCs, portable game machines, electronic dictionaries, television sets, and car navigation systems.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A display device comprising:
   a panel;
   a backlight disposed under the panel, and including light sources and a circuit board for supplying drive signals to the light sources; and
   an adhesive tape having a shape of a rectangular frame including a pair of short sides along the circuit board and a pair of long sides which connect end portions of the pair of short sides, having a light blocking property, and bonded to an end portion of a front surface of the panel, a side surface of the panel, and a side surface of the backlight,
   wherein
   the panel includes:
   a pair of substrates; and
   a polarizer opposed to the backlight with the pair of substrates therebetween; and a long side of the adhesive tape is bonded opposite end faces of the pair of substrates, extends along the pair of substrates to a side of the pair of substrates on which the polarizer is placed, and is bonded to a peripheral edge portion of the pair of substrates such that the long side of the adhesive tape is opposed to an end face of the polarizer, and wherein:

the backlight further includes:
- a light guide;
- a frame opposed to at least an end face of the light guide; and
- a reflector placed in a position opposite the panel with the light guide and the frame therebetween;

the long side of the adhesive tape is bonded opposite the side surface of the panel, is opposed to an outer peripheral face of the frame, is placed between the frame and the reflector, and is bonded to the frame at the outer peripheral face of the frame; and the short side of the adhesive tape bonds the frame and the reflector together between the frame and the reflector.

2. The display device according to claim 1, wherein:

the adhesive tape includes a portion extending from an area bonded to the side surface of the panel; and the portion is bonded to a peripheral edge portion of the panel on a side opposite to a side on which the backlight is situated.

\* \* \* \* \*